Figure 1:
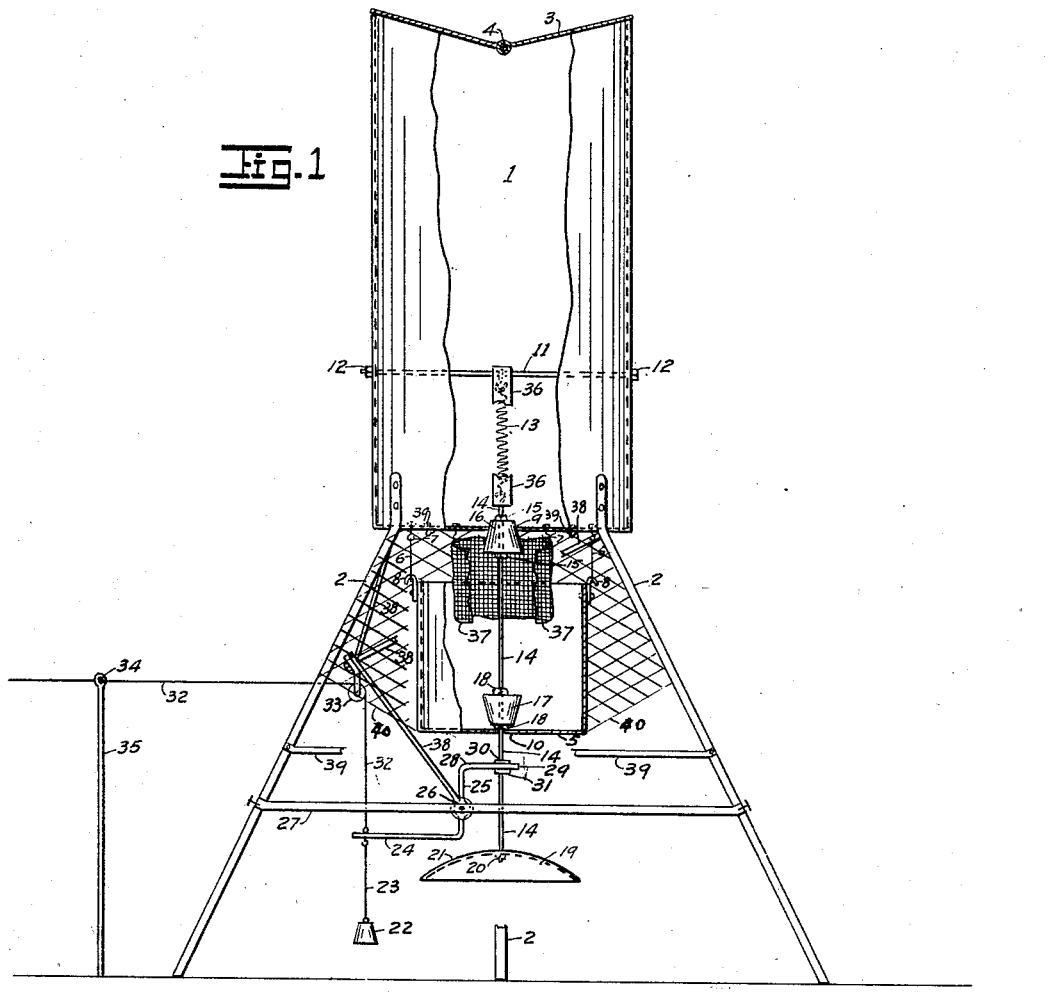

April 21, 1931.  C. ZEHNER  1,801,787
APPARATUS FOR FEEDING FOWL
Filed Oct. 8, 1928

Patented Apr. 21, 1931

1,801,787

UNITED STATES PATENT OFFICE

CHRISTIAN ZEHNER, OF VANCOUVER, BRITISH COLUMBIA, CANADA

APPARATUS FOR FEEDING FOWL

Application filed October 8, 1928, Serial No. 310,990, and in Canada January 13, 1928.

This invention relates to apparatus used to distribute grain or other feed to fowl, and the object of the invention is to provide mechanical means whereby the said feed may be measured and scattered upon the floor of the chicken house or in litter, to be picked up by the fowl, the said apparatus being possible of operation from a point at some distance from its location, such for instance as a dwelling house, thus providing a convenience to be greatly appreciated in inclement weather.

The invention will be fully understood from the detailed description hereinafter presented when taken in connection with the accompanying drawings forming a part hereof, in which similar characters of reference indicate similar parts throughout, and in which:—

Fig. 1 is a somewhat diagrammatic side elevation of the entire apparatus.

In the drawings 1 indicates an elevated storage tank of a capacity adapting it to carry a supply of feed considerably in excess of daily requirements, so that periodical refilling only will be required.

As a preferable means of maintaining the tank in elevated position it may be mounted upon a plurality of supports or legs 2 suitably secured to the tank and downwardly divergingly disposed therearound to ensure stability.

The cover 3 of the tank is preferably of concave conformation as shown to form a receiving hopper for grain, the sides of which converge to a central opening 4 through which the grain may flow to fill the tank. By this arrangement removal of the cover to the tank becomes unnecessary and chickens are barred from access to the grain therein.

5 indicates a measuring container disengageably suspended immediately below the tank, such suspension being preferably accomplished by means of links 6 which engage hooks 7 and 8 on the tank and measure respectively.

9 and 10 indicate aligned outlet openings centrally formed in the bottoms of the tank and measure respectively.

It will here be observed that the bottoms of both the tank 1 and measure 5 might have been hoppered in the manner described for the cover 3 to ensure a clean discharge therefrom, but as such constructions are a matter of common knowledge to persons familiar with the art, it has not been thought necessary to illustrate them.

A rod 11 crosses the interior of the tank 1 horizontally at some distance above and directly over the outlet opening 9 in the bottom thereof, the threaded ends of the said rod passing out through the sides of the said tank and being secured thereto by means of nuts 12.

A coiled spring 13 is dependingly secured to the rod 11 directly over the outlet opening 9 in the bottom of the tank 1 and a threaded rod 14, suspended from the lower end of the spring, passes centrally down through the outlet openings 9 and 10 in the bottoms of the tank and measure.

Adjustably mounted upon the rod 14 between nuts 15—15 is an upwardly tapered plug, or stopper 16 for the opening 9 in the bottom of the tank 1, the adjustment of the said plug 16 being such that when the spring 13 is under very little tension, or in contracted position, the plug is drawn up and entered in the opening 9 to close the same.

Lower down upon the rod 14 is a reversely tapered plug or stopper 17 for the opening 10 in the bottom of the measure 5 so adjusted between nuts 18—18 as to leave the opening 10 in the measure open when the opening 9 in the tank is closed.

19 indicates a circular spreading disk secured to the lower extremity of the rod 14 by means of a nut 20, the said disk being preferably formed with a convex upper surface 21 so that grain falling upon the same will be scattered in all directions and will not remain as a weight upon the disk.

The spring 13, it will here be observed, functions mainly as an elastic or resilient means under tension of holding the rod 14 in vertical position, the said rod being maintained in its normal or raised position by a weight 22 suspended by a cord 23 from the long arm 24 of a lever 25 pivotally fulcrumed as at 26 to a cross bar 27 spanning the space between and having its extremities secured to the adjacent legs 2 of the tank structure. The short arm 28 of the lever has its end 29 bifurcated or otherwise shaped to engage between the nuts 30 and 31 on the rod 14.

32 indicates a cord or cable having one end secured to the arm 24 of the lever 25, the cable thence passing over direction changing idle sheave 33 suitable supported by supports 38 and thence through the eyes 34 of supports 35 sufficient in number to carry it to the desired point of operation.

36 indicates a tube of rubber or other suitable material enclosing the spring 13 to prevent the grain in the tank from packing between the coils of the said spring and interfering with the elasticity of the same.

37 indicates a sleeve, preferably of canvas, secured to the under side of the tank 1 around the outlet opening 9 in the bottom of the said tank and extending loosely down into the measure 5, of a suitable size to prevent overflowing of the said measure.

40 indicates a netting attached to the lower extremity of said tank by means of hooks 39 and enclosing the measure therein to prohibit access by the fowl to the measure, illustrated as partly cut away.

Normally the end 29 of the lever 25, due to action of the weight 22, exerts an upward pressure upon the under side of the nut 30, thus holding the rod 14 in raised position, the outlet opening in the tank 1 closed, and the opening in the measure 5 open; when it is desired to operate the mechanism the cable 32 is pulled to raise the long arm 24 of the lever 25 and with it the weight 22, thus the end 29 of the short arm 28 of the lever is made to press downwardly upon the upper side of the nut 31, the rod 14 is depressed, the opening 10 in the measure is closed by the plug 17 and the opening 9 in the bottom of the tank is opened. The grain is thus permitted to flow from the tank into the measure the cable being held back a sufficient length of time to allow this to fill and then released to allow the parts to return to their normal positions.

As the grain falls from the opening 10 in the bottom of the measure it strikes the convex surface of the disk 19 and is scattered in all directions.

The foregoing description embodies the preferred form of apparatus, but slight changes and variations therefrom will readily occur to persons skilled in the art to which it pertains, such for instance as the making of the rod 14 in three separate parts instead of one as shown, but such changes and modifications I would of course claim as mine could they be shown to come within the spirit of the invention or within the scope of the appended claims.

What I claim is:—

1. Apparatus of the kind described comprising an elevated tank and a measure suspended below the tank, said tank and measure being formed with aligned outlets in the bottoms thereof, a yieldingly suspended vertically movable rod, stoppers mounted upon the rod in spaced relation to the outlets and to each other, movement of said rod serving to selectively and simultaneously close one of the outlets and open the other, and a weight operatively connected with the rod to normally maintain the said rod in raised position and the outlet from the tank closed.

2. Apparatus of the kind described comprising an elevated tank and a measure suspended below the tank, said tank and measure being formed with aligned outlets in the bottoms thereof, a yieldingly suspended vertically movable rod, stoppers mounted upon the rod in spaced relation to the outlets and each other, a spreader secured to the lower extremity of the rod, and a lever operatively connected with the rod arranged to normally maintain the said rod in raised position but reversely operable to change the relative positions of the stoppers to the outlets.

3. Apparatus of the kind described comprising an elevated tank for grain or the like and a measure suitably supported below the tank, said tank and measure being formed with outlets in the bottoms thereof, a vertically movable rod passing through the outlets, a suitably supported spring in the tank from which the rod is suspended, a casing around the spring to protect the same from contact with the grain in the tank, a stopper on the rod below the outlet from the tank, a stopper on the rod above the outlet from the measure, movement of said rod serving to simultaneously open one of the outlets and close the other, and a weight normally maintaining the rod in raised position to close the outlet in the tank.

4. Apparatus of the kind described comprising an elevated tank and a suitably supported measure below the tank, said tank and measure being formed with aligned outlets in the bottoms thereof, a bar crossing the interior of the tank, a spring dependingly secured to the bar, a tubular casing to protect the spring from pressure, a rod suspended from the spring, stoppers on the rod for the outlets, movement of the rod serving to simultaneously close one outlet and open the other, a lever operatively connected with the rod, manually operated means to raise the lever from a distance to permit grain to flow from the tank into the measure means between the tank and measure to prevent overflow of the said measure, and a weight for the lever operative to depress the same to permit the parts to return to normal position with the outlet in the tank closed.

CHRISTIAN ZEHNER.